April 19, 1927.
J. P. McKNIGHT
1,625,486
APPARATUS FOR MOLDING CEMENTITIOUS MATERIAL
Filed June 2, 1925   2 Sheets-Sheet 1
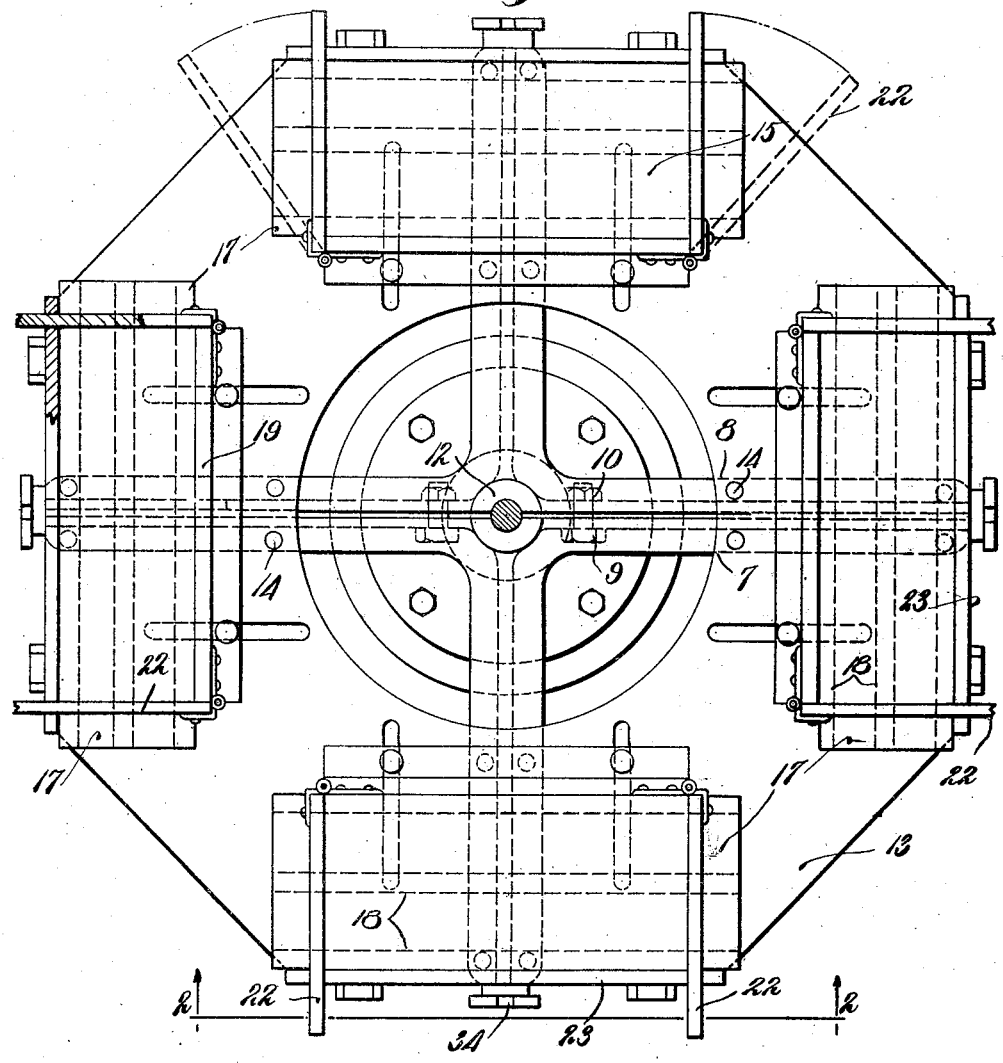
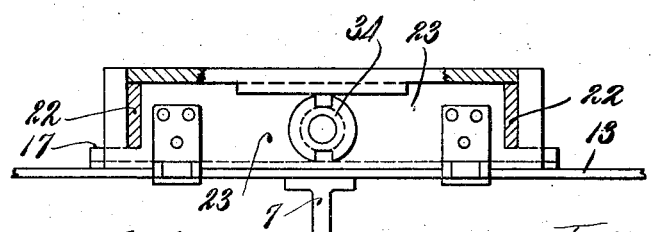
Inventor:
John P. McKnight,
by Roberts, Roberts & Cushman
Attys.

April 19, 1927.
J. P. McKNIGHT
1,625,486
APPARATUS FOR MOLDING CEMENTITIOUS MATERIAL
Filed June 2, 1925      2 Sheets-Sheet 2
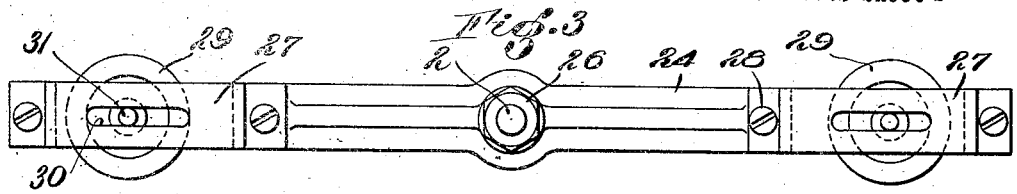
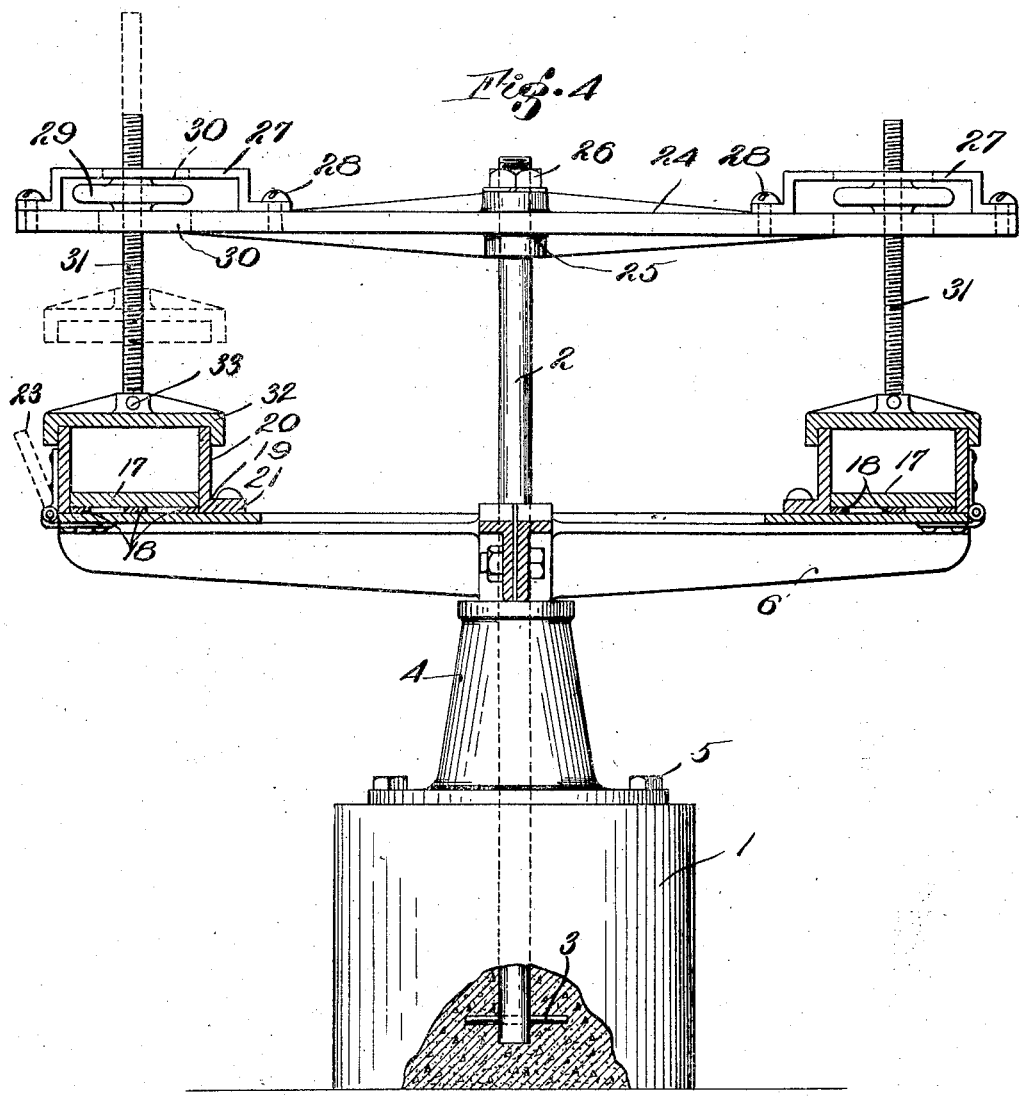
Inventor:
John P. McKnight,
by Roberts, Roberts & Cushman
Attys.

Patented Apr. 19, 1927.

1,625,486

UNITED STATES PATENT OFFICE.

JOHN P. McKNIGHT, OF REVERE, MASSACHUSETTS.

APPARATUS FOR MOLDING CEMENTITIOUS MATERIAL.

Application filed June 2, 1925. Serial No. 34,325.

Objects of the invention are to provide an adjustable mold capable of making blocks of different dimensions and configurations, especially of the type known as ashlar; to arrange and mount the molds in such a manner as to render the necessary operations in the making of the blocks fewer and thus produce a material saving of time and labor; and to provide a new and improved molding apparatus having the features of construction and arrangement hereinafter described.

For purposes of illustration the invention is shown in the accompanying drawings in which—

Fig. 1 is a top plan view of the apparatus for molding cementitious material;

Fig. 2 is a section on line 2—2 of Fig. 1;

Fig. 3 is a top plan view of the arm carrying the mold covers; and

Fig. 4 is a side elevation of the molding apparatus with the spider and molds shown in section.

As illustrated the reference numeral 1 designates a supporting base made of concrete or other suitable material. Firmly embedded within the supporting base 1 is a shaft 2 having a pin 3 projecting diametrically through its lower end and serving to assist in maintaining the rigid mounting of the shaft. The shaft 2 passes through a bearing 4 mounted on top of the supporting base 1 by means of the bolts 5 and said shaft extending upwardly beyond the bearing receives a spider designated as a whole by the numeral 6.

The spider member 6 consists of two parts 7 and 8 held together by the bolts 9 and nuts 10. The center portion of the spider member 6 forms a hub 12 which is journalled on the shaft 3 and projecting radially from said hub are a number of T-shaped channel members forming the spider.

A plate 13 having a perimeter forming an octagon is riveted or otherwise fastened to the spider at the points 14. At four diametrically opposite sides of the plate 10 and near the edge thereof are located the molding forms 15.

The forms 15 comprise a removable bottom 17 spaced from the plate 13 by the strips 18, and an adjustable back member 19 having a vertical portion 20 and horizontal portion 21. The horizontal portion 21 of the member 19 has a plurality of depending lugs adapted to ride in elongated slots formed in the plate 13 and thus permitting the adjustment of the molding forms relative to said plate. The side walls 22 of the form 15 are hinged to the member 19 thus allowing the sides 22 to swing from open to closed position or vice versa. The front cover 23 of the form 15 is hinged to the plate 13 and has formed in the center an opening 34 adapted to receive the terminal of an air line or other pressure means for compacting the block. Formed in each side and near its edge of the cover 23 are recesses adapted to receive the front edges of the side walls 22. As will be apparent the rear wall of the mold may be moved toward the center of the plate 13 thus increasing the dimensions of the mold and brick formed therein without affecting the compactness of the mold inasmuch as the projecting ends of the side walls 22 can move through the recesses in the front cover 23. It will therefore be obvious that the adjustment of the rear wall is only limited by the extent to which the side walls extend beyond the front cover.

On the extreme upper end of the shaft 2 an arm 24 having a hub portion 25 is journalled on said shaft 2. The upper end of the shaft 2 is screw-threaded and a nut 26 retains the arm in position on the shaft. At each end of the arm 24 a bracket member 27 is mounted thereon through the medium of the bolts or rivets 28. The space formed between the bracket and the arm contains a loosely positioned threaded wheel 29. The walls of the bracket and arm have aligned elongated slots 30. A screw 31 extends through the slots 30 and through the nut 26 at its upper end. At the lower end of the screw 31 there is detachably mounted a cover 32 adapted to fit over the top of the mold. The pin 33 extends through the collar on the cover and screw 31 and retains the cover in position. Inasmuch as the threaded wheel 29 is loosely mounted in the space between the bracket and arm and the screw 31 can be laterally moved in the elongated slots 30, it will be apparent that the cover 32 is laterally adjustable. The cover 32 may be raised or lowered by rotation of the wheel 29.

Two opposite molds are closed and filled, preferably by two operators respectively working at opposite locations, the apparatus is turned 90° and while the two aforesaid molds are being emptied by different operators the other molds are filled by the first operators, and opposite molds are thus alternately filled and emptied. If the molds are filled from the top the sides and front are held closed in any suitable manner until the top is clamped on, but the molds are preferably filled by forcing the material through a hose or pipe attached to the one inlet 34.

As the top cover of the mold, as well as other sides of the mold, are detachable, it will be obvious that the interior walls of the mold may be of any configuration so as to make any design of brick desired.

I claim:

1. Apparatus for molding cementitious material comprising a supporting member, a shaft carried by said base member, supporting means mounted on the shaft and rotatable about the axis thereof, the supporting means carrying at spaced intervals a series of molding forms adapted to contain cementitious material and a cover for any one of said molds carried by a support mounted on said shaft above said supporting means and rotatable about the axis thereof.

2. Apparatus for molding cementitious material comprising a base supporting member, a shaft carried by said base member, a spider mounted on the shaft and rotatable about the axis thereof, supporting means on the spider carrying at spaced intervals a series of adjustable molding forms adapted to contain cementitious material and an adjustable cover for any one of said molds carried by an arm mounted on the upper end of said shaft and rotatable about the axis thereof.

3. Apparatus for molding cementitious material comprising a series of molds adjustably mounted on a supporting member and rotatable therewith, a plurality of covers for said molds adjustably mounted on a support and rotatable with said support.

4. Appparatus for molding cementitious material comprising a supporting member, a shaft carried by said member, supporting means mounted on the shaft, the supporting means carrying at spaced intervals a series of molding forms, and a plurality of covers adjustably mounted on supporting means above the first mentioned supporting means and adapted to be brought into engagement with said molds.

5. Apparatus for molding cementitious material comprising a supporting member, a shaft carried by said member, supporting means mounted on the shaft intermediate its ends, the supporting means carrying at spaced intervals a series of molding forms, an arm mounted on the uper end of the shaft and a cover for the molds depending from each end of the arm.

6. Apparatus for molding cementitious material comprising a supporting member, a shaft carried by said member, a spider mounted on the shaft intermediate its ends and rotatable about the axis thereof, supporting means on the spider carrying at spaced intervals a series of adjustable molding forms, an arm mounted on the upper end of the shaft and rotatable about the axis thereof and an adjustable cover for the molds depending from each end of the arm.

Signed by me at Boston, Massachusetts, this twenty-ninth day of May, 1925.

JOHN P. McKNIGHT.